United States Patent
Holscher et al.

(10) Patent No.: US 7,634,635 B1
(45) Date of Patent: Dec. 15, 2009

(54) SYSTEMS AND METHODS FOR REORDERING PROCESSOR INSTRUCTIONS

(76) Inventors: Brian Holscher, 3080 NE. Sunburst Ave., Hillsboro, OR (US) 97124-1684; Guillermo Rozas, 104 Magneson Ter., Los Gatos, CA (US) 95032; James Van Zoeren, 151 S. Bernardo Ave., # 18, Sunnyvale, CA (US) 94086; David Dunn, 4525 191st Pl., NE, Sammamish, WA (US) 98074

( * ) Notice: Subject to any disclaimer, the term of this patent is extended or adjusted under 35 U.S.C. 154(b) by 198 days.

(21) Appl. No.: 11/400,631

(22) Filed: Apr. 7, 2006

Related U.S. Application Data (63) Continuation-in-part of application No. 09/332,338, filed on Jun. 14, 1999, now Pat. No. 7,089,404.

(51) Int. Cl.
*G06F 9/30* (2006.01)

(52) U.S. Cl. ...................................... 711/220; 712/225

(58) Field of Classification Search ................. 711/220; 712/225
See application file for complete search history.

(56) References Cited

U.S. PATENT DOCUMENTS

| | | | |
|---|---|---|---|
| 5,253,349 A | 10/1993 | Kreitzer | |
| 5,269,017 A | 12/1993 | Hayden et al. | |
| 5,274,815 A | 12/1993 | Trissel et al. | 395/700 |
| 5,349,658 A | 9/1994 | O'Rourke et al. | 395/700 |
| 5,421,022 A | 5/1995 | McKeen et al. | |
| 5,454,117 A * | 9/1995 | Puziol et al. | 712/23 |
| 5,467,473 A | 11/1995 | Kahle et al. | 395/800 |
| 5,511,175 A | 4/1996 | Favor | |
| 5,519,841 A | 5/1996 | Sager et al. | |
| 5,526,499 A | 6/1996 | Bernstein et al. | |
| 5,537,620 A | 7/1996 | Breternitz, Jr. | |
| 5,590,295 A | 12/1996 | Deosaran et al. | |
| 5,625,835 A | 4/1997 | Ebcioglu et al. | |
| 5,625,837 A | 4/1997 | Popescu et al. | |
| 5,627,981 A | 5/1997 | Adler et al. | |
| 5,751,983 A | 5/1998 | Abramson et al. | |
| 5,754,812 A | 5/1998 | Favor et al. | |
| 5,809,273 A * | 9/1998 | Favor et al. | 712/210 |
| 5,832,205 A | 11/1998 | Kelly et al. | 395/185.06 |
| 5,875,340 A | 2/1999 | Quarnstrom et al. | 395/733 |

(Continued)

FOREIGN PATENT DOCUMENTS

| | | |
|---|---|---|
| GB | 2324181 A | 10/1998 |
| WO | WO98/28689 | 7/1998 |

OTHER PUBLICATIONS

Gallagher, D. et al., Dynamic Memory Disambiguation etc., ASPLOS-VI Proceedings, Oct. 1994, pp. 1-13.

*Primary Examiner*—Christian P Chace
*Assistant Examiner*—Jared I Rutz (57) ABSTRACT

Systems and methods for reordering processor instructions. In accordance with a first embodiment of the present invention, a microprocessor comprises circuitry to process an instruction extension, wherein the instruction extension is transparent to the programming model of the microprocessor. The instruction extension may comprise a field for indicating an offset from a memory structure pointer. The microprocessor includes circuitry for adding the offset to the memory structure pointer to indicate a specific element of the memory structure. The specific element of the memory structure comprises address information corresponding to speculative data.

24 Claims, 5 Drawing Sheets

U.S. PATENT DOCUMENTS

| | | |
|---|---|---|
| 5,901,308 A | 5/1999 | Cohn et al. |
| 5,918,005 A | 6/1999 | Moreno et al. ......... 395/183.14 |
| 5,920,710 A | 7/1999 | Tan et al. |
| 5,931,957 A | 8/1999 | Konigsburg et al. |
| 6,011,908 A | 1/2000 | Wing et al. ............ 395/182.17 |
| 6,031,992 A | 2/2000 | Cmelik et al. |
| 6,065,115 A | 5/2000 | Sharangpani et al. |
| 6,141,742 A * | 10/2000 | Favor ......................... 711/220 |
| 6,148,394 A | 11/2000 | Tung et al. |
| 6,173,366 B1 | 1/2001 | Thayer et al. |
| 6,185,668 B1 | 2/2001 | Arya |
| 6,192,465 B1 | 2/2001 | Roberts |
| 6,202,204 B1 | 3/2001 | Wu et al. |
| 6,216,200 B1 | 4/2001 | Yeager |
| 6,463,523 B1 | 10/2002 | Kessler et al. |
| 2003/0177340 A1* | 9/2003 | Janik et al. .................. 712/219 |

* cited by examiner

SYSTEMS AND METHODS FOR REORDERING PROCESSOR INSTRUCTIONS

RELATED APPLICATION

This application is a Continuation-in-Part of, commonly owned U.S. patent application Ser. No. 09/332,338, filed Jun. 14, 1999 now U.S. Pat. No. 7,089,404, entitled "Method and Apparatus for Enhancing Scheduling in an Advanced Microprocessor" to Rozas et al., which is hereby incorporated herein by reference in its entirety.

BACKGROUND OF THE INVENTION

1. Field of the Invention

Embodiments of the present invention relate to systems and methods for reordering an execution sequence of processor instructions.

2. Related Art

A computer processing system stores sequences of instructions in memory for execution by a processor unit. In many cases, a performance advantage may be obtained by executing some of these instructions in a different, or reordered, sequence, in contrast to an original sequence, for example, as established by a programmer. It is generally necessary for automated systems to manage such reordered execution in order to ensure that the execution result of a reordered instruction sequence is identical to the result of executing an original order instruction sequence.

SUMMARY OF THE INVENTION

Accordingly, systems and methods for reordering processor instructions are needed. In addition, systems and methods for reordering processor instructions that provide for greater numbers of reordered memory operations would be advantageous. Further, systems and methods for reordering processor instructions that are compatible and complimentary with conventional computer processor architecture systems and methods are highly desired.

Systems and methods for reordering processor instructions are disclosed. In accordance with a first embodiment of the present invention, a microprocessor comprises circuitry to process an instruction extension, wherein the instruction extension is transparent to the programming model of the microprocessor. The instruction extension may comprise a field for indicating an offset from a memory structure pointer. The microprocessor includes circuitry for adding the offset to the memory structure pointer to indicate a specific element of the memory structure. The specific element of the memory structure comprises address information corresponding to speculative data.

In accordance with another embodiment of the present invention, a microprocessor comprises a memory structure for accepting an address range of a speculative memory operation. A first circuitry coupled to the memory structure is for loading the address range into the memory structure responsive to an instruction extension. A second circuitry is coupled to the memory structure for comparing the address range to an address of a current memory operation executing on the microprocessor.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Systems and Methods for Reordering Processor Instructions

It is to be appreciated that reordering of instruction sequences can be performed by primarily hardware-oriented systems, by primarily software-oriented systems or by systems employing combinations of hardware and software, in varying degrees. Many high-end microprocessors, for example, as designed for applications in desktop computers, employ primarily hardware-oriented systems for reordering instruction execution. For example, an instruction sequence is loaded from memory, and the microprocessor itself modifies the instruction sequence.

In a case of software-oriented systems for reordering instruction execution, a microprocessor may be designed to execute instructions substantially in the order that they are loaded from memory. Software processes, e.g., an "optimizing" process, may reorder an original instruction sequence into a reordered instruction sequence prior to storage in memory and subsequent access by the microprocessor.

It is to be appreciated that both hardware and software oriented systems for reordering of instruction sequences, as well as combinations thereof, are well suited to embodiments in accordance with the present invention, and such embodiments are considered within the scope of the present invention. It is to be further appreciated that many processor systems load and/or store values to cache memories rather than directly to main memory. Embodiments in accordance with the present invention are well suited to caching as well as non-caching systems.

Computer systems that reorder a sequence of instructions for execution typically change the order of memory operations, for example, load and/or store instructions. For example, in general, load operations are more latency critical than store operations, as an instruction sequence depending upon a load operation cannot execute until the load is complete. In contrast, a store operation may usually be deferred until the memory (or cache) location is referenced by a load instruction.

In general, a reordered sequence of load and store operations may result in a different state of a memory, as opposed to the original, in-order sequence of load and store operations. For example, an exemplary sequence of: store immediate one; load; add one; and store the result, will place a value of two into a memory location. In contrast, the same instructions, executed in a different order, e.g., load; add one; store the result; and store immediate one, would place a different value, in this case one, into the memory location. In many cases, a computer system cannot determine that the reordered sequence will, or has, produced a potentially different result than the original sequence until some or all of the sequence has been executed.

Consequently, computer systems that reorder instruction execution generally comprise systems to track memory changes that occur during reordered execution, in order to support revision or "roll back" of memory changes if the system determines that such changes are necessary.

The following description of embodiments in accordance with the present invention is presented in terms of a very long instruction word (VLIW) microprocessor. In general, a "word" of a very long instruction word comprises multiple instructions, e.g., for a plurality of execution units, including various fields known as or referred to as "packet atoms" and "molecules." It is to be appreciated that embodiments in accordance with the present invention are well suited to other processor architectures.

In accordance with embodiments of the present invention, alias hardware compares incoming physical addresses from a memory pipeline with internally stored addresses, e.g., a range of addresses, for alias protection. An alias packet atom from an instruction molecule describes which protections should be set (addresses stored for comparison) and whether the incoming addresses should be checked against existing stored addresses. For example, a re-ordered store instruction, e.g., a speculative store operation, can specify that the memory location being changed needs to be monitored in case a load instruction depends upon that location. If the store/load sequence was reordered, a potential error may result in a need to roll back the store operation.

An address match can raise an alias fault. A software recovery process may use this hardware to track the reordering of memory loads and memory stores. If a request is reordered that should not have been reordered because of a data dependency, this hardware detects the data dependency and asserts an alias fault to a software process for resolution, for example, by rolling back memory operations to a known good condition.

Figure 1:
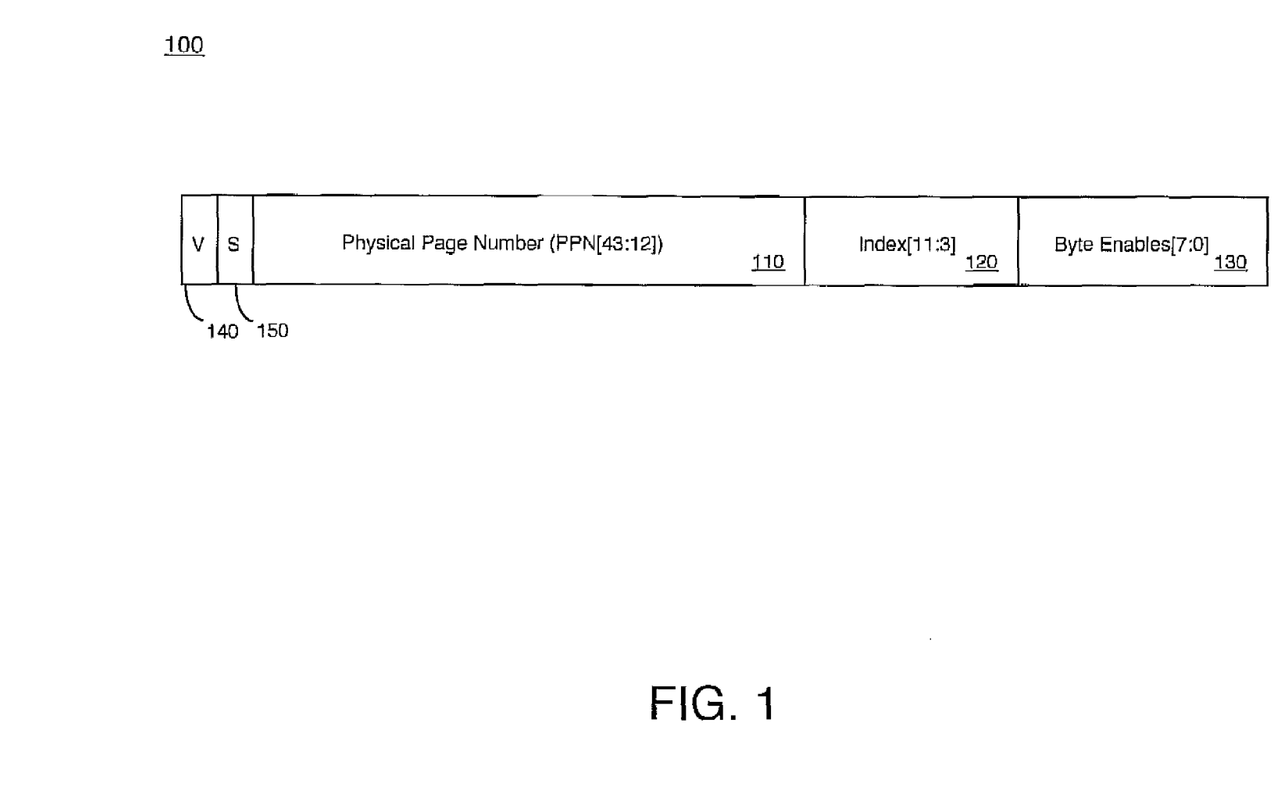
FIG. 1 illustrates an exemplary alias protection register, in accordance with an embodiment of the present invention.

FIG. 1 illustrates an exemplary alias protection register 100, in accordance with an embodiment of the present invention. In general, an alias protection memory element describes an area, e.g., a single address or range, of memory. It is beneficial if the size of the area of memory represented in such a memory element corresponds to the size of an area of memory operable by load and/or store instruction, although this is not a requirement. Embodiments in accordance with the present invention will frequently comprise a plurality of memory elements, which may be referred to as a memory structure.

It is to be appreciated that embodiments in accordance with the present invention are well suited to utilizing a wide variety of types of computer usable storage, for example, registers, e.g., exemplary alias protection register 100, registers implemented as memory arrays, and/or "main" memory, external to a microprocessor.

Alias protection register 100 accepts and stores a physical address broken up into a physical page number field 110, an index number field 120 and eight byte enable bits in byte enables field 130. Physical page number field 110 stores bits 43 to 12 of a physical address and index number field 120 stores bits 11 to 3 of the physical address.

In accordance with embodiments of the present invention, physical page number field 110 or index number field 120 may be physically implemented as a content addressable memory (CAM) in order to enable address matching with incoming addresses.

Alias protection register 100 further comprises a valid bit 140 and a store bit 150. Valid bit 140 is set on a write to alias protection register 100. Store bit 150 is set if the physical address (specified in physical page number field 110 and index number field 120) has been protected with a store operation. Store bit 150 may be used to qualify load checks.

In accordance with embodiments of the present invention, writing of the alias protection register 100 and enabling of address checking may be controlled through alias packets that are issued along side load and store operations, e.g., within a very long instruction word.

In accordance with embodiments of the present invention, a plurality of alias protection registers may be utilized as a circular queue. In this manner, a head of queue pointer known as an alias head pointer (AHPTR) may be advantageously used to implement a least recently used reuse policy for alias registers.

Figure 2:
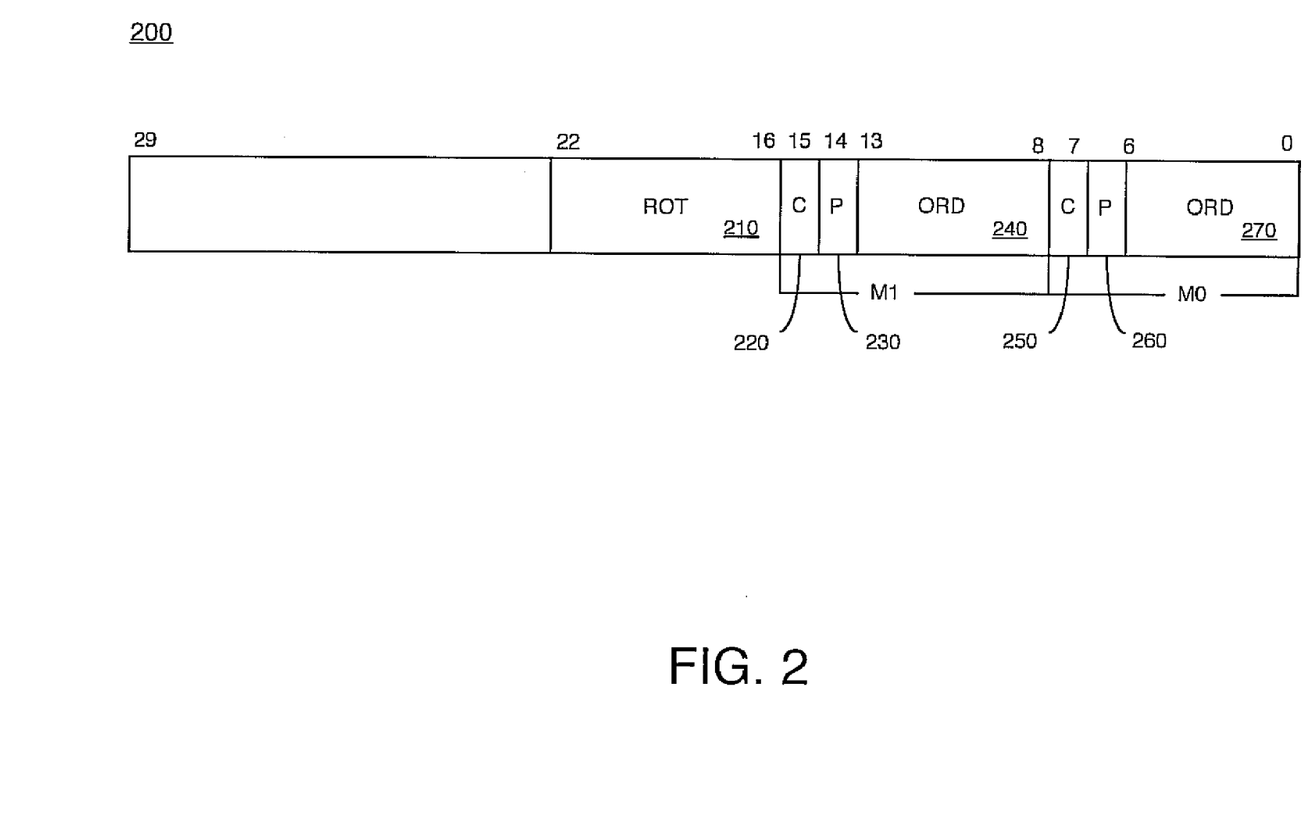
FIG. 2 illustrates an exemplary alias packet supporting two load/store pipelines, in accordance with embodiment of the present invention.

FIG. 2 illustrates an exemplary alias packet 200 supporting two load/store pipelines (M0 and M1), in accordance with embodiment of the present invention. Alias packet 200, in general, comprises an extension to an instruction that is transparent to the programming model. The extension is used to load an alias protection register, e.g., with an address range, and/or to initiate checking of alias protection registers in conjunction with a memory operation. It is appreciated that embodiments in accordance with the present invention are well suited to other forms of alias protection register control.

Alias packet 200 comprises a rotate field 210 in bit positions 22:16. Rotate field 210 indicates that the alias head pointer is to be rotated by an amount indicated in the field. Rotate field 210 is seven bits wide in order to support register rotations of up to 64 positions.

Alias packet 200 comprises a check pipeline M1 field 220 in bit position 15. A one value in check pipeline M1 field 220 indicates that the present M1 pipeline memory operation is to be checked against a plurality of alias registers, e.g., alias register 100 of FIG. 1. Alias packet 200 further comprises a protect pipeline M1 field 230 in bit position 14. A one value in protect pipeline M1 field 230 indicates that the present M1 pipeline memory operation address is to be placed into an alias register, e.g., alias register 100 of FIG. 1.

Alias packet 200 comprises an ordinal value M1 field 240 in bit positions 13:8. The contents of ordinal value M1 field 240 indicate which of the plurality of alias registers will be written for the M1 memory operation. The value in ordinal value M1 field 240 is an offset relative to the alias head pointer.

On a check operation, the ordinal value indicates which alias protection registers, or a range of alias protection registers, are to be checked.

Alias packet 200 further comprises check pipeline M0 field 250, protect pipeline M0 field 260 and ordinal value M0 field 270 as indicated in FIG. 2. The functions of these fields are analogous to those of fields 230, 240 and 250, with the difference that the functions of fields 250, 260 and 270 are directed to pipeline M0.

Based upon the contents of an alias packet, e.g., alias packet 200, an alias protection register, e.g., alias protection register 100 of FIG. 1, can be written with a physical address of a load/store operation. Likewise, protection hardware may check the physical address of a load/store operation against the plurality of alias protection registers.

Figure 3:
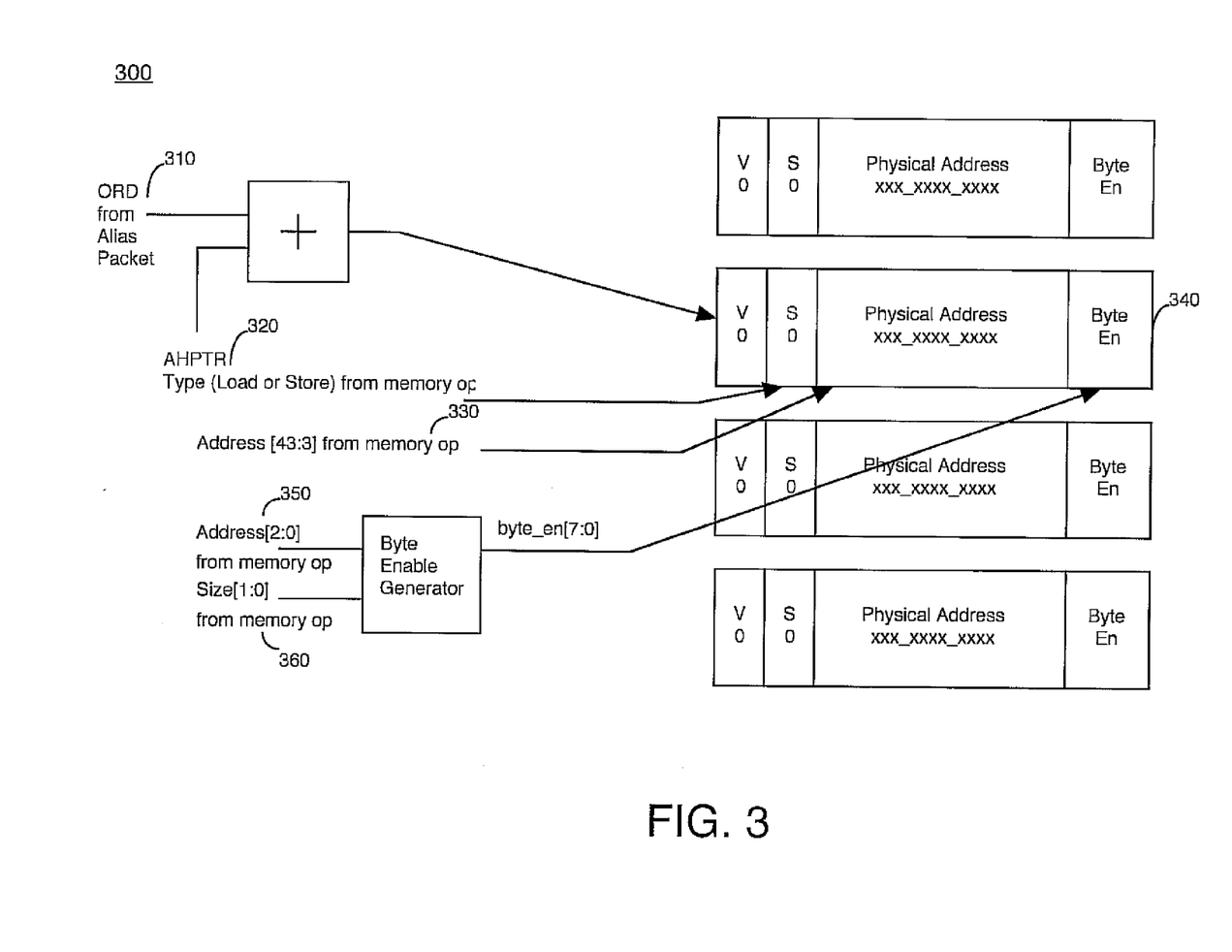
FIG. 3 illustrates an exemplary operation of an alias packet writing an alias protection register, in accordance with embodiments of the present invention.

FIG. 3 illustrates an exemplary operation of an alias packet writing an alias protection register 300, in accordance with embodiments of the present invention. It is to be appreciated that the exemplary embodiment of FIG. 3 illustrates operation with respect to a single pipeline with four alias protection registers. Embodiments in accordance with the present invention are well suited to varying quantities of memory pipelines as well as varying quantities of alias protection registers.

The ORD field 310, e.g., ordinal value M1 field 240 of FIG. 2, from an alias packet is added to an internal pointer alias head pointer 320 to select which alias protection register will be written. Such ordinal values are an offset from the alias head pointer 320 and refer to how far ahead the load/store is from the alias head pointer 320 reference point. In this example, alias protection register 340 is selected. It is appreciated that alias protection register 340 may be similar in construction and function to alias protection register 100 of FIG. 1.

In the case of a write operation, bits 43:3 (330) of the address are supplied responsive to the write operation, e.g., a write instruction included within a very long instruction word. Bits 330 are copied into the alias protection register 340. The lower 3 bits of the address 350 and size information 360 (both from the memory operation) are used by byte enable generator 370 to generate a byte enable field that is copied into the alias protection register 340.

Figure 4:
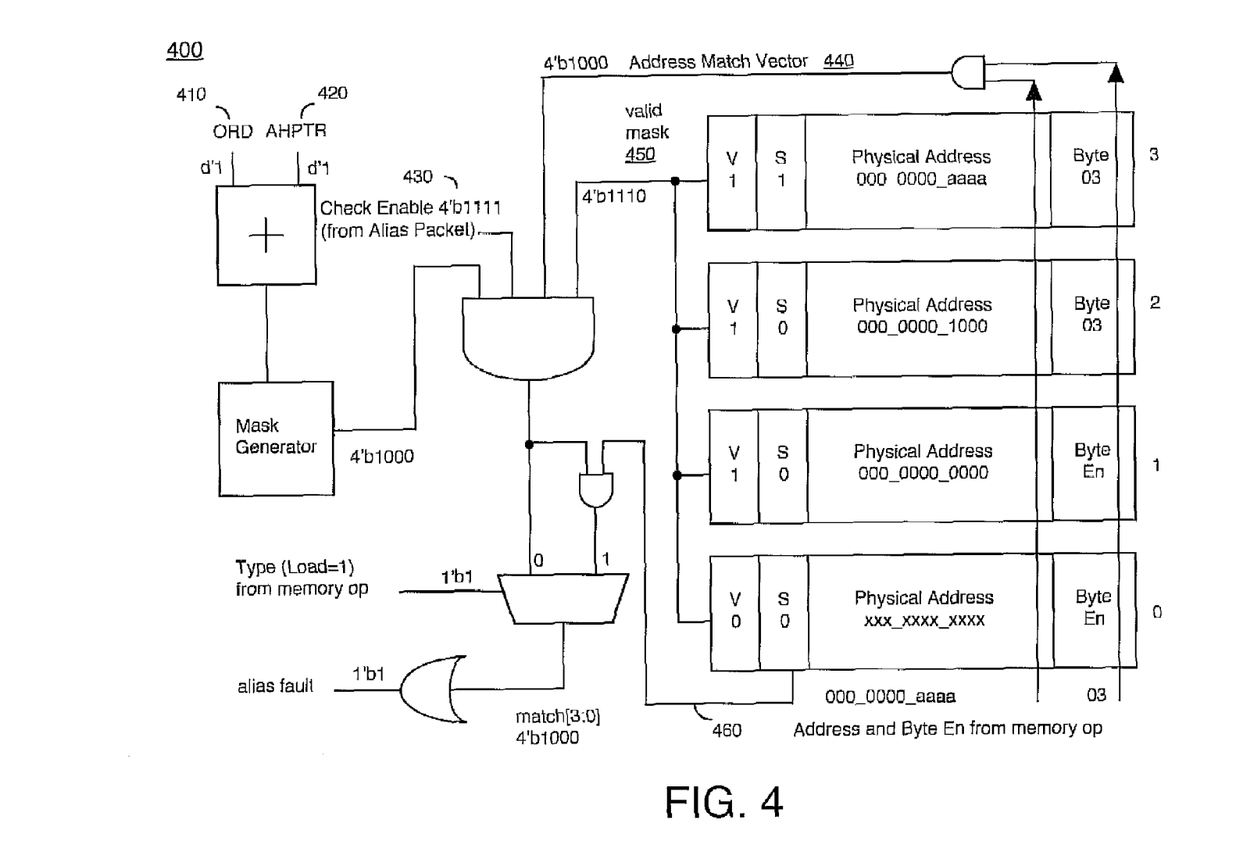
FIG. 4 illustrates a block diagram of exemplary circuitry for determining a potential alias fault, in accordance with embodiments of the present invention.

FIG. 4 illustrates a block diagram 400 of exemplary circuitry for determining a potential alias fault, in accordance with embodiments of the present invention. The ORD value 410 from the alias packet, e.g., from ordinal value M0 field 270 of FIG. 2, and the alias head pointer 420 are added together. The sum is used to generate a mask so that only alias protection registers of a equal or greater index (address) that the sum of ORD 410 plus alias head pointer 420 are checked. In this manner, the number of alias protection registers that are checked is advantageously reduced. Additionally, stale information that may be contained in some alias protection registers does not generate unnecessary fault indications.

The mask value is ANDed with the check enable 430, e.g., from check pipeline M0 field 250 of FIG. 2, an address match vector 440 and a valid mask 450 made up of the valid bits for each alias protection register. The address match vector is created from address matches. Bits 43:3 of a memory operation address are matched, e.g., via content addressable memory, with the physical address fields of the alias protection registers.

Using bits 2:0 of the same address and size information from the memory operation, a generated byte enable field (same as the one used for write) is compared with the byte enable fields of each alias protection register. In the case of the byte enables, instead of a match occurring if all the bits of the byte enable field match (an AND of the matched bits), a match for that register occurs if any of the bits match (an OR of the matched bits).

The resulting physical address match vector (one bit for each register) is ANDed with the byte enable match vector to create the address match vector 440. The resulting AND of all these vectors is further qualified by the memory being a load or store. If the operation is a load, the match vector is further ANDed with a vector 460 made up of the alias protection register store bits in order that only store operations will be compared against load operations. If the memory operation is a store, then it is compared to both load operations and store operations. The resulting vector is ORed together to signal an alias fault 470 if any of the match[3:0] bits are one.

It is to be appreciated that, in accordance with embodiments of the present invention, it is not necessary to take an immediate action in response to an alias fault, e.g., alias fault 470. For example, in some processor designs, an alias fault indicates that a currently executing, or soon to be executed, instruction will potentially corrupt memory and such an instruction must not be allowed to complete. Such processor designs frequently impose severe timing constraints on an alias fault signal as well as the circuitry that stops the triggering instruction from executing.

However, embodiments of the present invention, in conjunction with a commit/rollback processor architecture, can defer alias fault indications until a subsequent commit action. Advantageously, such deferral capability eliminates the deleterious timing constraints of the conventional art.

Figure 5:
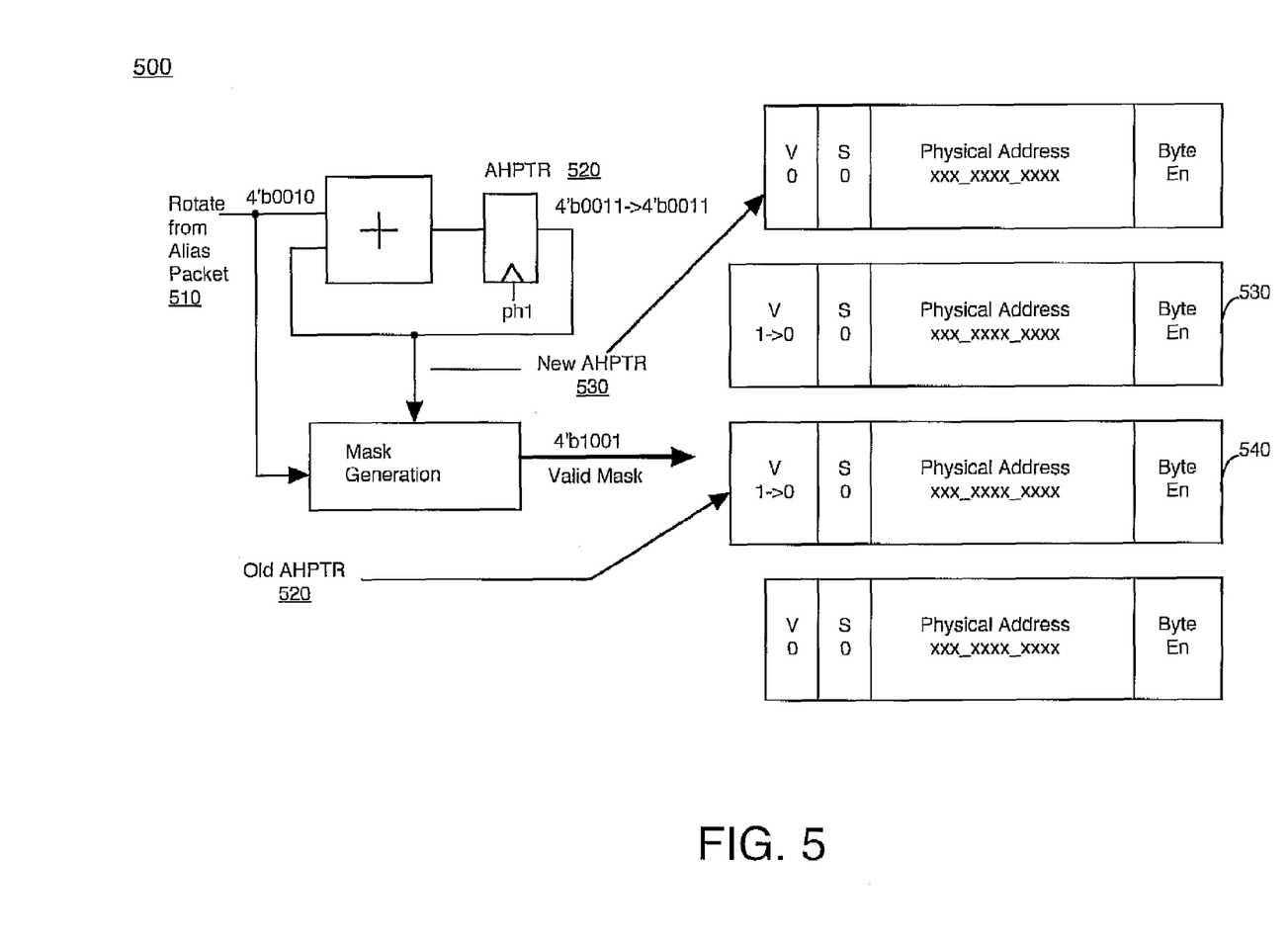
FIG. 5 illustrates a block diagram of exemplary circuitry for updating an alias head pointer, in accordance with embodiments of the present invention.

FIG. 5 illustrates a block diagram 500 of exemplary circuitry for updating an alias head pointer, in accordance with embodiments of the present invention. The rotate field 510 from the alias packet, e.g., rotate field 210 of FIG. 2, is added to the alias head pointer 520 to create the new alias head pointer value 530. In parallel, the rotate field 510 and the old alias head pointer value 520 are used to create a mask for invalidating alias protection registers between the new alias head pointer value 530 and old alias head pointer value 520. In this example, the rotate field 510 has a value of 2 decimal and the current (old) alias head pointer value 520 is 1 decimal. The new alias head pointer value 530 will be 3 decimal and the alias protection registers 530 and 540 will have their valid bits cleared by the mask.

In summary, embodiments of the present invention provide systems and methods for reordering a sequence of execution of processor instructions. In addition, embodiments of the present invention provide systems and methods for reordering processor instructions that provide for greater numbers of reordered memory operations. Further, the systems and methods for reordering processor instructions disclosed are compatible and complimentary with conventional computer processor architecture systems and methods.

Embodiments in accordance with the present invention are thus described. While the present invention has been described in particular embodiments, it should be appreciated that the present invention should not be construed as limited by such embodiments, but rather construed according to the below claims.

What is claimed is:

1. A microprocessor comprising:
    circuitry to process an instruction extension of a current memory operation, wherein the instruction extension is transparent to the programming model of the microprocessor, and wherein the instruction extension includes a field for indicating an offset; and circuitry for adding the offset to an alias protection memory structure pointer to indicate a specific memory element of an alias protection memory structure, wherein the specific memory element includes address information corresponding to speculative data.

2. The microprocessor of claim 1 further comprising circuitry to compare a current memory operation address to address contents of the alias protection memory structure, wherein the alias protection memory structure comprises memory elements having a range of addresses including the specific memory element as an endpoint.

3. The microprocessor of claim 1 wherein the instruction extension further comprises a field to indicate a rotation of the alias protection memory structure pointer.

4. The microprocessor of claim 1 wherein the instruction extension further comprises a field indicating that a current memory operation address is to be written in a memory element of the alias protection memory structure.

5. The microprocessor of claim 1 wherein the instruction extension further comprises a field indicating that a check is to be performed of a current memory operation address against a subset of elements of the alias protection memory structure.

6. The microprocessor of claim 1 wherein the instruction extension further comprises fields for control of alias protection circuitry to correspond to more than one memory pipeline.

7. A microprocessor comprising:
an alias protection memory structure for storing memory addresses corresponding to a plurality of speculative memory operations;
circuitry to add an offset value from an instruction extension associated with a memory operation to an alias protection memory structure pointer value to indicate a specific element of the alias protection memory structure; and
circuitry to store an address of the memory operation into the specific element of the alias protection memory structure.

8. The microprocessor of claim 7 further comprising circuitry to set a valid bit in the specific element responsive to storing the address of the memory operation into the specific element.

9. The microprocessor of claim 7 further comprising circuitry to set a bit value in the specific element indicative of the memory operation comprising a load or a store operation.

10. A microprocessor comprising:
an alias protection memory structure for storing memory addresses corresponding to a plurality of speculative memory operations; and
circuitry for comparing memory address contents of the alias protection memory structure against a memory address of a current memory operation; and
circuitry for limiting compared elements of the alias protection memory structure to a range of addresses based on a sum of an alias protection memory structure pointer value and an offset value accessed from an instruction extension associated with the current memory operation.

11. The microprocessor of claim 10 further comprising circuitry for limiting compared elements of the alias protection memory structure to elements of the alias protection memory structure comprising a valid indication.

12. The microprocessor of claim 10 further comprising circuitry for limiting compared elements of the alias protection memory structure to elements of the alias protection memory structure comprising a load state indication.

13. The microprocessor of claim 10 further comprising circuitry for limiting compared elements of the alias protection memory structure to elements of the alias protection memory structure comprising a store state indication.

14. The microprocessor of claim 10 further comprising circuitry to indicate an alias fault responsive to determining that the memory address is contained within memory address information of an element of the alias protection memory structure.

15. The microprocessor of claim 14 wherein the alias fault is raised synchronously with the current memory operation.

16. The microprocessor of claim 14 wherein the alias fault is deferred to a later occurring memory operation.

17. The microprocessor of claim 14 wherein the alias fault is posted to be raised as an asynchronous interrupt.

18. The microprocessor of claim 16 further comprising circuitry to reset valid bits of elements of the alias protection memory structure comprising addresses between the second pointer value and the first pointer value.

19. A microprocessor comprising:
an alias protection memory structure for storing address information of speculative data;
an alias protection memory structure pointer register for storing a first pointer value; and
circuitry to add a rotate value from an instruction extension to the alias protection memory structure pointer register to produce a second pointer value.

20. A microprocessor comprising:
a means for adding an offset from an instruction extension of a current memory operation to an alias protection memory structure pointer to indicated a specific alias protection register of an alias protection memory structure; and
a means for detecting a data dependency of a memory operation reordering if an address of the current memory operation matches an address of the specific alias protection register when a compare field in the instruction extension is set to a predetermined state.

21. The microprocessor of claim 20 further comprising:
the means for adding further including a means for adding a rotate from the instruction extension of the current memory operation to the alias protection memory structure to indicate a range of alias protection registers of an alias protection memory structure; and
the means for detecting a data dependency of the memory operation reordering if the address of the current memory operation matches an address of the rage of alias protection registers when the compare field in the instruction extension is set to the predetermined state.

22. The microprocessor of claim 20, further comprising:
a means for storing address information from the instruction extension in the specific alias protection register if a place field in the instruction extension is set to a predetermined state;
means for setting a store/load field of the specific alias protection register responsive to the type of the current memory operation; and
means for setting a valid field of the specific alias protection register to a predetermined state.

23. The microprocessor of claim 20, further comprising the means for detecting a data dependency of a memory operation reordering if an address of the current memory operation matches an address of the specific alias protection register when the compare field in the instruction extension is set to a predetermined state and a valid field is set to a predetermined state.

24. The microprocessor of claim 20, further comprising a means for indicating an alias fault responsive to detecting the data dependency.

\* \* \* \* \*

UNITED STATES PATENT AND TRADEMARK OFFICE
CERTIFICATE OF CORRECTION

PATENT NO. : 7,634,635 B1
APPLICATION NO. : 11/400631
DATED : December 15, 2009
INVENTOR(S) : Holscher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this

Ninth Day of November, 2010

David J. Kappos
*Director of the United States Patent and Trademark Office*